United States Patent [19]

Zweekly

[11] 4,188,162
[45] Feb. 12, 1980

[54] INDEXABLE INSERT DRILL

[75] Inventor: Raymond T. Zweekly, Royal Oak, Mich.

[73] Assignee: The Valeron Corporation, Oak Park, Mich.

[21] Appl. No.: 864,627

[22] Filed: Dec. 27, 1977

[51] Int. Cl.² .............. B23B 29/03; B26D 1/00; B26D 1/12; B23B 51/00
[52] U.S. Cl. .............. 408/199; 408/239 R; 407/113; 407/114
[58] Field of Search .......... 408/186, 199, 200, 203, 408/239 R; 144/219, 240, 241; 407/113, 114

[56] References Cited

U.S. PATENT DOCUMENTS

| 3,341,919 | 9/1967 | Lovendahl | 408/239 X |
| 3,343,431 | 9/1967 | Boyer | 407/113 X |
| 3,460,409 | 8/1969 | Stokey | 408/199 |
| 3,504,413 | 4/1970 | Siewert et al. | 408/199 X |
| 3,707,747 | 1/1973 | Falk | 407/114 |
| 3,791,001 | 2/1974 | Bennett | 407/113 |
| 3,815,191 | 6/1974 | Holma | 407/114 |
| 4,047,826 | 9/1977 | Bennett | 408/199 X |
| 4,072,438 | 2/1978 | Powers | 408/239 R |

Primary Examiner—Horace M. Culver

[57] ABSTRACT

An indexable insert drill with a parallelogram shaped insert positioned at a negative axial lead, the insert having a slanted recess which provides an angularly oriented cutting edge extending from a face cutting corner through or slightly under and substantially beyond the drill axis, and a unique notch in the cutting edge providing chip interruption and stabilized lead.

13 Claims, 8 Drawing Figures

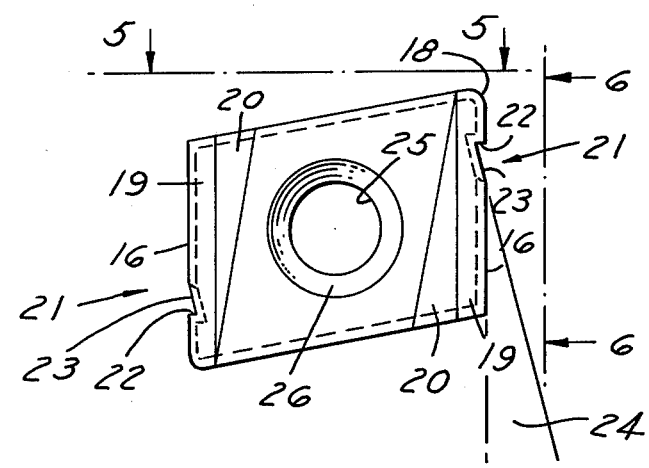
FIG. 4
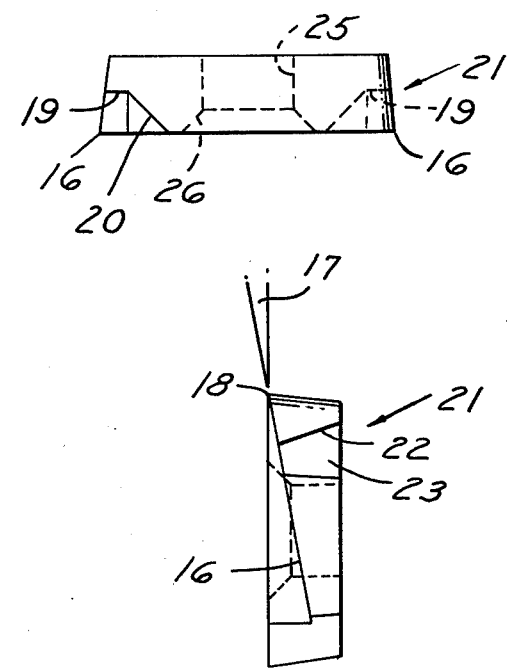
FIG. 5
FIG. 6

INDEXABLE INSERT DRILL

BACKGROUND OF THE INVENTION

The prior art includes a center cutting end mill as disclosed in U.S. Pat. No. 3,938,231 wherein square inserts are positioned with zero axial lead angle for axial plunge cutting or for radial feed; also indexable insert drills of the type shown in U.S. Pat. Nos. 3,540,323 and 3,963,365 which employ a pair of square inserts each having eight indexable cutting edges positioned so that the active lead cutting edge of one cuts the inner half while the other cuts the outer half of the hole.

A further development shown in U.S. Pat. No. 4,124,328 provides an improved construction capable of use in drilling hole depths as great as 3 to 3½ times drill diameter which are clean, smooth and straight without relying on wear strips or shank surface contact with a hole wall for guidance. A pair of inserts are employed having only slight but identical lead angles in the range of 0° to 5°, which may be either positive or negative, the cutting edges of which sweep through a common cone of revolution with one radially innermost insert having an arcuate corner intersected by the drill axis and the other radially overlapping outermost insert having an outer arcuate corner establishing the cutting periphery and the diameter of the drilled hole.

Other prior drills are known having a replaceable insert with an uninterrupted cutting edge extending above a radial line and terminating without extending overcenter.

SUMMARY OF THE PRESENT INVENTION

The present indexable insert drill is particularly adapted for small diameter holes through use of a single parallelogram shaped positive insert installed with an acute apex cutting corner in an axially leading radially outermost position providing axial side clearance and a negative axial lead. The top face of the insert lies above the drill axis. A slanted recess starting at the insert cutting corner deepens progressively to provide a cutting edge passing through or slightly below the drill axis and may extend substantially beyond the axis.

A notch provided in the cutting edge has a radially outermost edge extending substantially parallel to the axis of the drill to provide an interruption in the width of the chip and also to stabilize the drill through tracking on the uncut metal of the workpiece extending into the notch. The insert is seated in a pocket disposed at a negative axial rake angle with double side wall and substantially full bottom seat engagement and is secured by a beveled screw extending through a hole at the insert center. Either of two identical cutting edges may be alternately indexed to an active cutting position.

While the insert may be used in pairs for larger diameter holes it is particularly useful as a single insert drill for relatively small diameter holes with improved stability and cutting speed relative to prior art indexable insert drills.

The same insert may be used for different diameter drills by simply employing an insert pocket extending to a more or less over-center position, in each case locating the bottom seat to correctly position the cutting edge.

DESCRIPTION OF THE DRAWINGS

FIG. 4 is an enlarged face view of a typical insert employed in the drill;

FIG. 5 is a side elevation of the insert shown in FIG. 4; and

FIG. 6 is an end elevation of the insert shown in FIG. 4.

DESCRIPTION OF A TYPICAL PREFERRED EMBODIMENT

Figure 1:
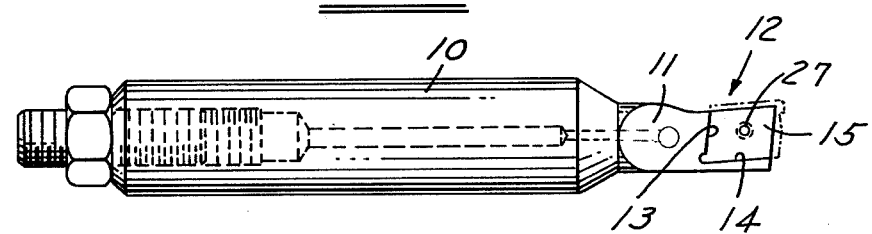
FIG. 1 is a side elevation of an indexable insert drill in accordance with the present invention.
Figure 1A:
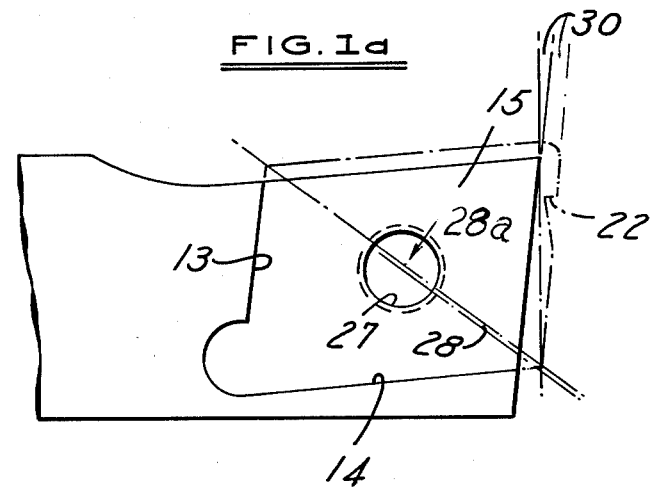
FIG. 1a is an enlarged fragmentary view of the insert end of the drill shown in FIG. 1.
Figure 2:
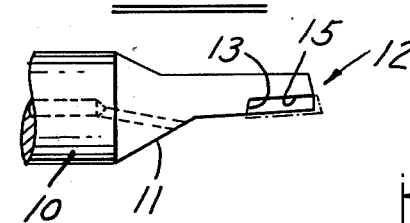
FIG. 2 is a similar fragmentary side elevation rotated 90°.

With reference to FIGS. 1, 1a, 2 and 3 the drill comprises a shank 10 having a reduced end 11 with an insert pocket 12 formed therein having a lateral extending side wall 13, an axially extending side wall 14 and a bottom seat 15 which may extend at a 4° negative axial rake angle as shown in FIG. 2.

With reference to FIGS. 4, 5 and 6 the insert is formed as a positive 80° parallelogram with 7° positive rake side wall cutting clearance on all four sides. A leading cutting edge 16 provided at either end of the insert is formed at the terminal edge of a slanted recess extending at an angle 17, preferably within a range of 5°–11°, from a slightly rounded cutting corner 18. A bottom surface 19 of the recess, terminating in the leading cutting edge 16, extends normal to the plane of FIG. 6 but optionally can be oriented with either a positive or negative rake angle (and also could be part of a conical surface as shown in U.S. Pat. No. 3,800,379), while a chip breaking face 20 projects from the top face of the insert at a 45° angle as best shown in FIG. 5 and widens away from the cutting corner 18.

As shown in FIGS. 4 and 6 a notch 21 is formed in each cutting edge 16 having a sharp angle with one radially outermost wall 22 extending as installed substantially parallel to the axis of the drill intersecting a second wall 23 extending at a 15° angle 24 relative to the cutting edge 16 as shown in FIG. 4.

A screw hole 25 with beveled screw head seat 26 is formed at the center of the insert. With reference to FIG. 1a, in the insert pocket of the drill the tapped hole 27 projects normal to the seat 15, with an offset 28 in a direction 28a within the angle between the walls 13 and 14 so that screw head pressure will force the insert into a firm engagement with the walls as well as the seat when screwed down.

Figure 3:
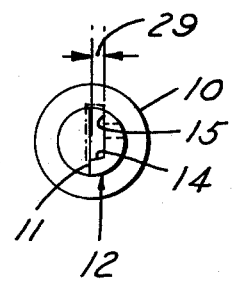
FIG. 3 is an end view of the drill.
Figure 3A:
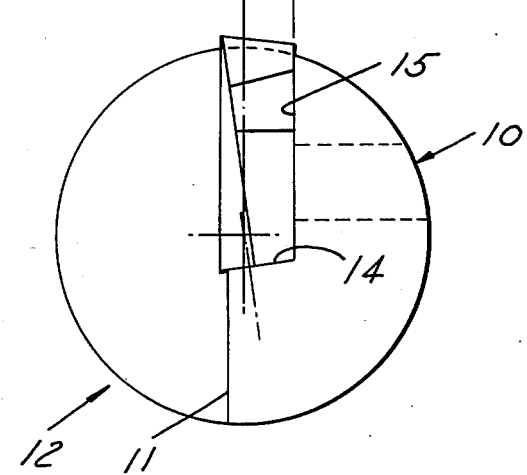
FIG. 3a is an enlarged end view showing greater detail of the insert installation in a larger diameter drill.

As best shown in FIG. 3a the seat 15 of the pocket is spaced from the axis at the end 11 of the drill at a depth 29 less than the thickness of the insert so that the slope of the cutting edge will pass through or slightly (e.g. not usually exceeding 0.006″) behind the axis of the drill when installed in cutting position. As best shown in FIG. 1a the insert is installed with a cutting edge at approximately a 2°–7° negative lead angle 30, preferably 5°, so that the extension of the cutting edge beyond the drill axis will clear the slightly conical end wall of the workpiece cut surface as the drill progresses axially through the workpiece. The acute angle shape of the insert also provides a clearance angle with the side wall of the drilled hole in the workpiece.

The 7° clearance angle on all four sides of the insert provides circumferential clearance for the portion of the insert extending below center, as shown in FIG. 3a, as well as axial clearance for the cutting edge, and will accommodate a negative axial rake angle as shown in FIG. 2 for greater holder strength at the base of the insert although a neutral or even positive axial rake may be used in certain cases.

A comparison of FIGS. 3 and 3a illustrates optional locations of the same size insert for different diameter drills. In each case the bottom of the pocket is provided to locate the insert with its cutting edge passing through or slightly below the drill axis, preferably at a distance within the range of 0" to 0.004" to maximize cutting edge life at the axial center.

The slanted recess cutting edge with the outer cutting corner at the face of the insert permits maximum insert thickness and strength where required as well as the advantage of the cutting edge crossing center to accommodate use in different drill diameters.

The radially outermost notch wall 22 in addition to interrupting the chip will provide a guide surface against the uncut shoulder of the workpiece to stabilize the drill against vibration and drift in the drilling operation immediately upon drill entry into the workpiece. This has proved to be a highly critical provision to achieve straight chatterfree smooth wall drilling operations and is an essential feature of the disclosed construction.

From the foregoing description it will be understood that while this tool is used primarily for drilling operations it can also be used as a single point boring tool for enlarging or finishing a drilled hole as well as for facing, turning or contouring either OD or ID workpiece surfaces. The larger insert positioned to extend beyond center provides desirable strength and insert stability compared to a smaller insert confined to a single quadrant; and the slanted recess providing a cutting edge passing through or just below center with overcenter clearance provides insert thickness strength at the cutting corner, optimum cutting action to center and freedom from over-center backward rubbing at the conical center cut surface of the workpiece.

I claim:

1. A replaceable insert drill comprising a shank having a center axis and a cutting insert end, a pocket at said insert end for locating a replaceable cutting insert, said pocket having a bottom insert face seating surface and side wall location for said insert, said seating surface extending to a radial extremity of said insert end on one side and substantially beyond the center axis of said drill on the other side, a parallelogram shaped cutting insert having a bottom seating face and a top face located in said pocket with an acute radially outermost axially leading cutting corner positioned to provide axial workpiece cutting clearance and negative axial lead, said insert having a slanting progressively deepening recess extending along the leading edge of its top face providing a cutting edge extending continuously in a notch interrupted straight line from said cutting corner at the outer face through or slightly under and substantially beyond the axis of said drill, and said notch comprising a chip interrupting notch in said cutting edge wherein said notch has a radially outermost non-cutting side which extends in a line substantially parallel to a designed axial direction of feed for said insert and a radially inwardly extending cutting side for leaving a substantial shoulder in the workpiece serving to stabilize the drill against vibration and drift upon axial drillentry into the workpiece.

2. A replaceable insert drill body as set forth in claim 1 wherein said seating surface has a negative axial rake angle.

3. A replaceable insert drill as set forth in claim 1 wherein said insert faces are joined by positive cutting clearance side walls.

4. A replaceable insert drill as set forth in claim 1 wherein said notch is formed as an acute angle having two straight sides.

5. A replaceable insert drill as set forth in claim 4 wherein said insert is indexable to either two cutting positions having identical cutting edges.

6. A drill as set forth in claim 1 wherein said negative axial lead extends at an angle in the order of 2°–7°.

7. A drill as set forth in claim 1 wherein said negative axial lead extends at an angle in the order of 5°.

8. A cutting insert having parallelogram shaped cutting face and seating surfaces, a cutting corner at an acute angle extremity of said face, a slanted recess extending from said corner with progressively greater depth along one edge of said face providing a cutting edge extending continuously in a notch interrupted straight line at a substantially slanted angle relative to said face and seating surfaces, and said notch in said cutting edge comprising a chip interrupting notch wherein said notch has a radially outermost non-cutting side which extends in a line substantially parallel to a designed axial direction of feed for said insert and a radially inwardly extending cutting side for leaving a substantial shoulder in a workpiece upon relative rotative and axial entry.

9. A cutting insert as set forth in claim 8 wherein said notch is formed as an acute angle having two straight sides.

10. A cutting insert as set forth in claim 8 wherein said notch has a radially outermost side which extends in a line substantially parallel to a designed axial direction of feed for said insert.

11. A cutting insert as set forth in claim 8 wherein said insert faces are joined by positive cutting clearance side walls.

12. A cutting insert as set forth in claim 8 having two identical cutting edges indexable to alternate active cutting positions.

13. A cutting insert as set forth in claim 8 wherein the angle of said slanted cutting edge is within a range of approximately 5° to 11° relative to said face and seating surfaces.

* * * * *